United States Patent [19]
Green

[11] Patent Number: 5,238,445
[45] Date of Patent: Aug. 24, 1993

[54] CAMPFIRE SKEWER

[76] Inventor: Ronald Green, 93 Malvern Dr., Sherwood Park Alberta, Canada, T8A 3S6

[21] Appl. No.: 875,985

[22] Filed: Apr. 29, 1992

[30] Foreign Application Priority Data

Jun. 20, 1991 [CA] Canada .................. 2045033

[51] Int. Cl.⁵ .................................. A47J 43/28
[52] U.S. Cl. .................... 452/198; 99/419; 99/421 A
[58] Field of Search ............ 452/198; 99/419, 421 A, 99/421 H, 421 R

[56] References Cited

U.S. PATENT DOCUMENTS

| | | | |
|---|---|---|---|
| D. 171,539 | 2/1954 | Goodsell | 99/421 A |
| D. 244,903 | 7/1977 | Hildebrand | 99/421 A |
| 2,649,042 | 8/1953 | Wickman | 95/421 A |
| 2,876,694 | 3/1959 | Thomas | 99/421 A |
| 3,745,910 | 7/1973 | Delamater | 99/419 |
| 4,539,751 | 9/1985 | Chan | 99/421 A |
| 5,117,558 | 6/1992 | Hull | 99/421 A |

*Primary Examiner*—Willis Little
*Attorney, Agent, or Firm*—Davis, Bujold & Streck

[57] ABSTRACT

A campfire skewer consisting of an elongate member having a first end, a second end, a first portion adjacent the first end, and a second portion adjacent the second end. The first portion has a first axis and the second portion is offset from the first axis. The first end has means for impaling food. A hand grip is rotatably mounted on the first portion of the elongate member. By holding the hand grip and manipulating the second portion of the elongate member the elongate member can be made to rotate in a rotisserie-like fashion.

6 Claims, 4 Drawing Sheets

CAMPFIRE SKEWER

The present invention relates to a campfire skewer.

BACKGROUND OF THE INVENTION

When cooking over an open flame of a campfire foods, such as meat, vegetables and the like, are impaled on a skewer. The skewer is held by the user over the flame. With existing skewers care must be taken to turn the skewer frequently or the food being cooked will become burned and blackened on the side nearest the flame.

SUMMARY OF THE INVENTION

What is required is a skewer for use over the open flame of a campfire which facilitates the turning or rotating of the food being cooked.

In its most elementary form the present invention consists of an elongate member having .a first end and a second end, with the first end having means for impaling food. The elongate member has two portions; a first portion being positioned adjacent the first end, and a second portion adjacent the second end. A hand grip is rotatably mounted on the first portion of the elongate member such that by holding the hand grip and manipulating the second portion of the elongate member the elongate member can be made to rotate in a rotisserie-like fashion. However, in reducing the invention to practise it is preferred that the first portion have a first axis and the second portion be offset from the first axis. This relationship between the first portion and the second portion is maintained in all the embodiments described.

According to the present invention there is provided a campfire skewer which is comprised of an elongate member having a first end, a second end, a first portion adjacent the first end, and a second portion adjacent the second end. The first portion has a first axis and the second portion is offset from the first axis. The first end has means for impaling food. A hand grip is rotatably mounted on the first portion of the elongate member. By holding the hand grip and manipulating the second portion of the elongate member the elongate member can be made to rotate in a rotisserie-like fashion.

Although beneficial results may be obtained from the campfire skewer as described above, a further problem experienced by users of campfire skewers is that of burning their fingers when attempting to remove food from the end of the skewer. Even more beneficial results can be obtained by having the hand grip axially slidable along the first portion of the elongate member. This enables the user to slide the hand grip over that portion of the skewer adjacent the first end that was exposed to the heat of the flame while removing food from the end of the skewer. Stop means are positioned at each end of the first portion to limit the axial movement of the hand grip so it does not slide off the first portion.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
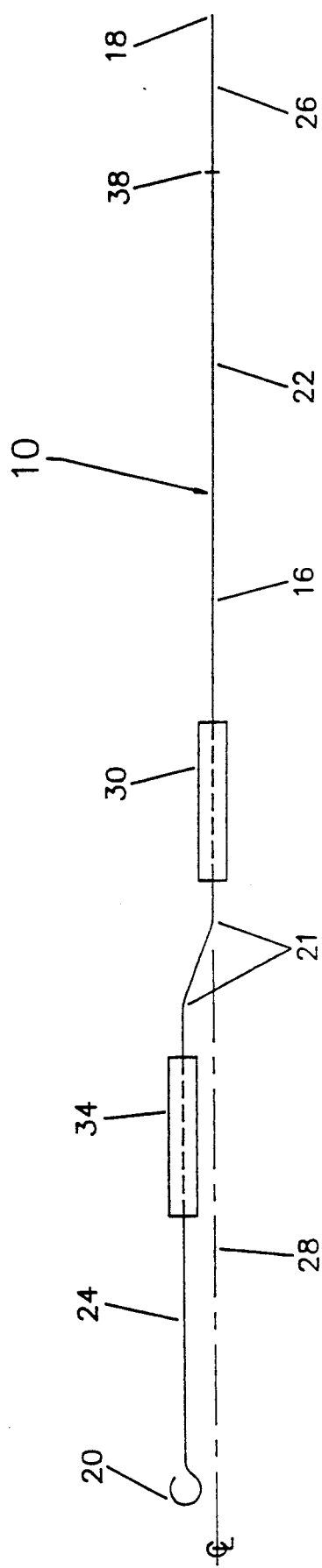
FIG. 1 is a side elevation of a first embodiment of a campfire skewer constructed in accordance with the teachings of the invention.
Figure 2:
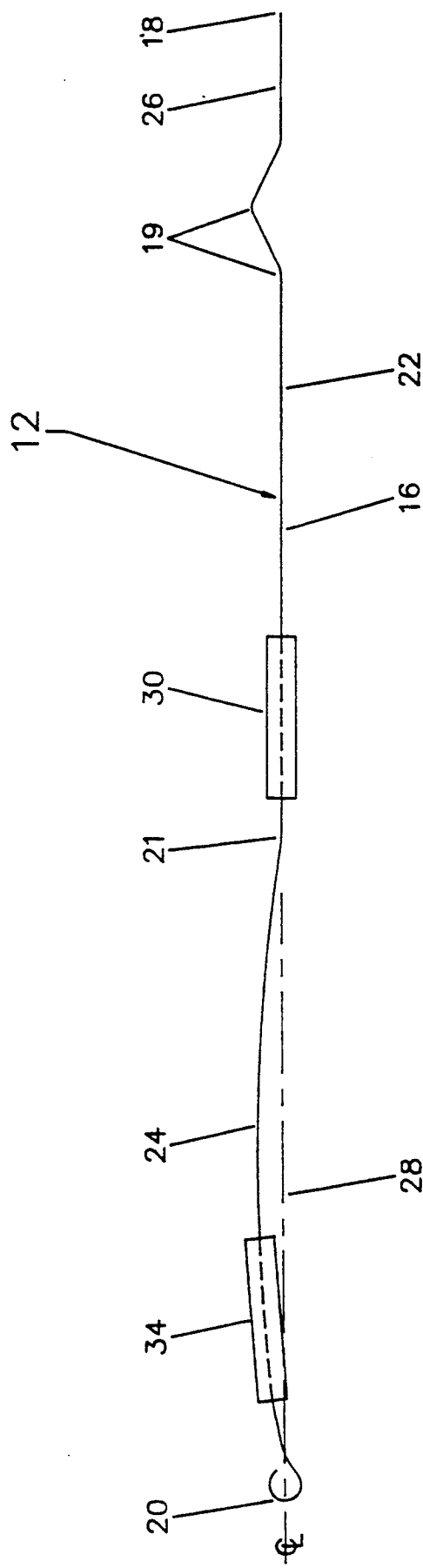
FIG. 2 is a side elevation view of a second embodiment of a campfire skewer constructed in accordance with the teachings of the invention.
Figure 3:
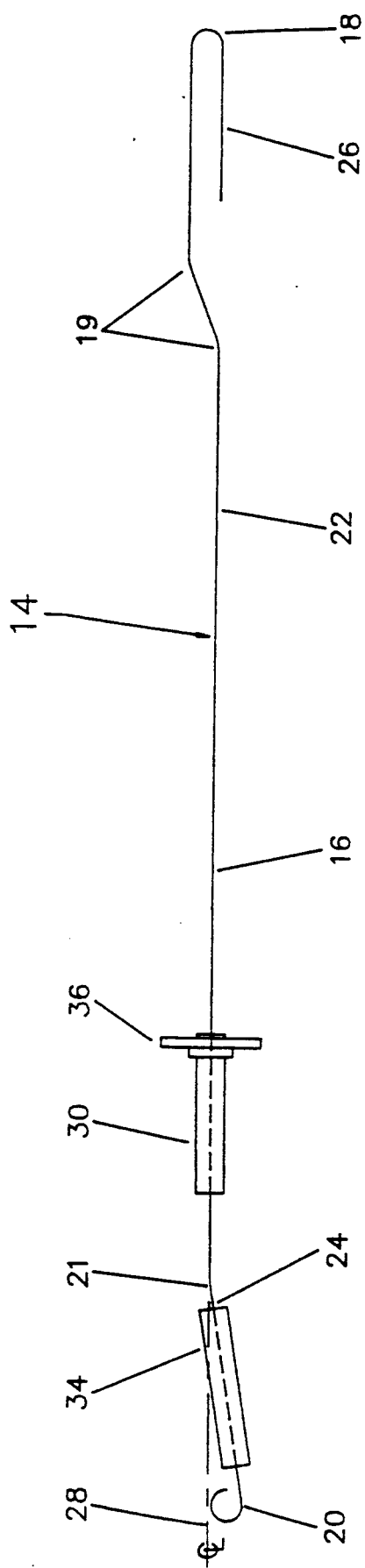
FIG. 3 is a side elevation view of a third embodiment of a campfire skewer constructed in accordance with the teachings of the invention.
Figure 4:
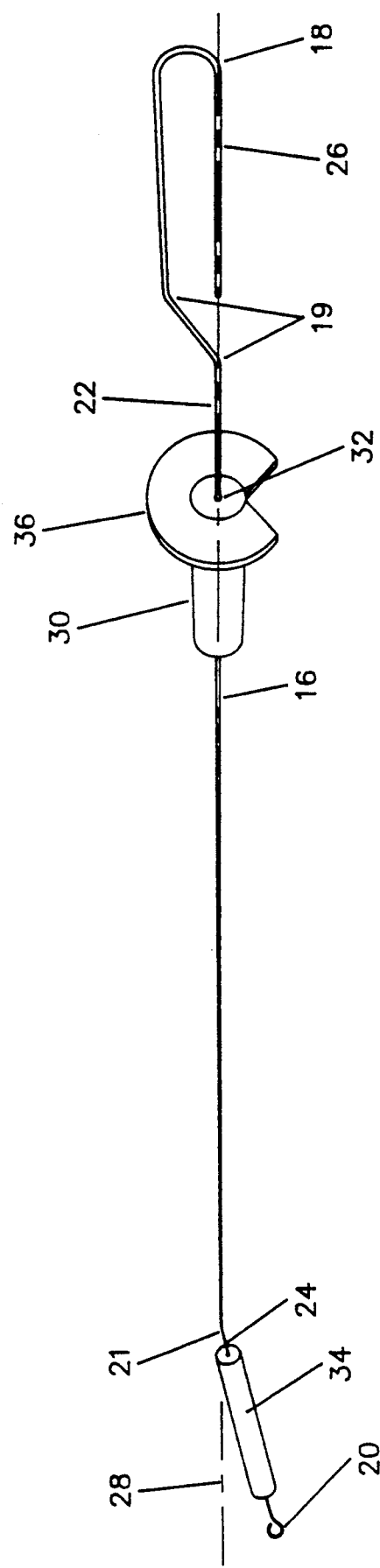
FIG. 4 is a perspective view of the campfire skewer illustrated in FIG. 3.

The present invention relates to a campfire skewer. Three embodiments of the invention are illustrated to demonstrate alternative ways that the teachings of the invention can be put into practise. A first embodiment is illustrated in FIG. 1, and generally identified by reference numeral 10. A second embodiment is illustrated in FIG. 2, and generally identified by reference numeral 12. A third embodiment is illustrated in FIGS. 3 and 4, and generally identified by reference numeral 14.

In its most elementary form the present invention consists of an elongate member having a first end and a second end, with the first end having means for impaling food. The elongate member has two portions; a first portion being positioned adjacent the first end, and a second portion adjacent the second end. A hand grip is rotatably mounted on the first portion of the elongate member such that by holding the hand grip and manipulating the second portion of the elongate member the elongate member can be made to rotate in a rotisserie-like fashion. However, in reducing the invention to practise it is preferred that the first portion have a first axis and the second portion be offset from the first axis. This relationship between the first portion and the second portion is maintained in all the embodiments described.

There will now be described those aspects of the invention common to all embodiments. Campfire skewers 10, 12, and 14 all consist of an elongate member 16 having a first end 18, and a second end 20. In the illustrated embodiments elongate member 16 is constructed of high tensile strength 0.162 inch diameter wire. According to the teachings of the invention elongate member 16 is divided into at least two portions. In illustrated embodiments this "dividing" is accomplished by the bending of the wire out of which elongate member 16 is constructed, these "bends", identified by reference numerals 21, serve a function as will be hereinafter explained. In the embodiments illustrated there are three portions; a first portion 22, a second portion 24 and an impaling portion 26. First portion 22 is adjacent first end 18. Second portion 24 is adjacent second end 20. First portion 22 has a first axis 28. Second portion 24 is offset from first axis 28. First end 18 has means for impaling food. With campfire skewer 10 this impaling means is in the form of impaling portion 26, which is in the form of a "spike". A first hand grip 30 is rotatably mounted on the first portion 22 of elongate member 16. In the illustrated embodiments first hand grip 30 is in the form of a wooden cylinder with a central passage 32. First hand grip 30 is axially slidable along first portion 22 of elongate member 16. Bends 21 and a transverse shoulder 38, being positioned at each end of first portion 22, serve as a "stop means" to limit the axial movement of first hand grip 30. A second hand grip 34 is rotatably mounted on second portion 24 of elongate member 16. Second end 20 of elongate member 16 is bent in a circular fashion and serves as a "stop means" to prevent inadvertent removal of second hand grip 34.

Embodiments 10, 12, and 14 of the invention all have similar components and operate in a like fashion. The purpose of illustrating the different embodiments is to demonstrate the diversity of ways in which second portion 24 of elongate member 16 can be "offset" from first axis 28, and improvements which can be added to enhance the operation of the invention. Campfire skewer 12 illustrated in FIG. 2 has, in addition to a different manner of creating an offset, a number of "bends" 19 are used as a stop means, as an alternative to transverse shoulders 38. Campfire skewer 14 illustrated in FIG. 3 has, in addition to a different manner of creating an offset, an impaling portion 26 which is generally "U" shaped to provide improved safety over the "spike" form of impaler used in campfire skewers 10 and 12. A further feature of campfire skewer 14 is the addition of a partial flange 36 to hand grip 30. Flange 36 serves a dual function as a rest to support first end 18 of elongate member 16, and a protective heat shield as will hereinafter be further described.

As can be noted from a review of FIG. 3, the offset forms an acute angle with the first axis. When first portion 22 is supported on an edge of a firepit, this type of offset enables first hand grip 30 and second hand grip 34 to be controlled with one hand while campfire skewer 14 is rotated by a wrist movement in a "wobbling" type of motion. Both first hand grip 30 and second hand grip 34 are held by the same hand, leaving the user with a free hand while ensuring that first hand grip 30 does not slide axially along elongate member 16 into the fire. This wobbling motion also enables two campfire skewers to be operated side by side, whereas two campfire skewers cannot be used side by side if they have an offset that is substantially a right angle or a series of offsets forming a crank.

The use and operation of the embodiments will now be described. Food, for example a hot dog, is impaled on impaling portion 26 of elongate member 16. With campfire skewer 14, impaling portion 26 is "U" shaped for safety reasons. The "U" design reduces the possibility of someone being injured if inadvertently poked by elongate member 16. With a hot dog (not shown) impaled upon impaling portion 26, first end 18 of elongate member 16 can be inserted into the open flame. As the hot dog cooks, elongate member 16 is made to rotate in a rotisserie-like fashion. This is accomplished by holding first hand grip 30 and manipulating second portion 24 of elongate member 16. By using second hand grip 34 elongate member 16 can be made to rotate smoothly. The positioning of first hand grip 30 on first portion 22 can be axially adjusted to suit the comfort of the user. It should be noted that "U" shaped impaler 26 still maintains the food on first axis 28. This is an attractive feature for if this relationship is not maintained the food is not balanced and will tend to provide a rotational force to the campfire skewer. In other words, without the food balanced on first axis 28, the food will move downwards by force of gravity as soon as the user lets go of second hand grip 34. When the hot dog has finished cooking, first end 18 of elongate member 16 is removed from the flame. The user then holds on to first hand grip 30 and places elongate member 16 in a vertical orientation with first end 18 up and second end 20 down. In this orientation first hand grip 30 slides along first portion 22 until it reaches the stop (bends 19 or transverse shoulders 38) which separates first portion 22 from impaling portion 26. Elongate member 16 would normally be hot at bend 19, which is adjacent to impaling portion 26, however, the user's hand is protected by first hand grip 30 as the user endeavours to remove the hot dog. With campfire skewer 14, as illustrated in FIGS. 3 and 4, the addition of flange 36 serves as a protective shield to protect the hand of the user from the heat of the flame during cooking and the heat of the food when removing food from the skewer. Flange 36 also enables a user to put campfire skewer 14 down with food still impaled on impaling portion 26 when first hand grip 30 is at first end 18 of elongate member 16, as flange 36 will provide enough clearance to ensure the food is suspended above the surface on which campfire skewer 14 is resting.

It will be apparent to one skilled in the art that modifications can be made to the illustrated embodiments without departing from the spirit and scope of the invention.

The embodiments of the invention in which an exclusive property or privilege is claimed are defined as follows:

1. A campfire skewer, comprising:
   a. an elongate member having a first end, a second end, a first portion adjacent the first end, and a second portion adjacent the second end, the first end having means for impaling food;
   b. a hand grip rotatably mounted on the first portion of the elongate member such that by holding the hand grip and manipulating the second portion of the elongate member, the elongate member can be made to rotate in a rotisserie-like fashion; and
   c. the first portion having a first axis and the second portion being offset from the first axis, the first end of the elongate member being "U" shaped and the means for impaling food being positioned on the first axis.

2. A skewer as defined in claim 1, the hand grip axially slidable along the first portion of the elongate member, stop means being positioned at each end of the first portion thereby limiting the axial movement of the hand grip.

3. A skewer as defined in claim 1, having a second hand grip rotatably mounted on the second portion of the elongate member.

4. A campfire skewer, comprising:
   a. an elongate member having a first end, a second end, a first portion adjacent the first end, and a second portion adjacent the second end, the first portion having a first axis and the second portion being offset from the first axis, the first end having means for impaling food;
   b. a first hand grip rotatably mounted on the first portion of the elongate member such that by holding the first hand grip and manipulating the second portion of the elongate member, the elongate member can be made to rotate in a rotisserie-like fashion, the first hand grip sliding axially along the first portion of the elongate member, stop means being positioned at each end of the first portion thereby limiting the axial movement of the hand grip;
   c. a second hand grip rotatably mounted on the second portion of the elongate member; and
   d. the first end of the elongate member being "U" shaped and the means for impaling food being positioned on the first axis.

5. The campfire skewer as defined in claim 1, the offset of the second portion forms an acute angle with the first axis.

6. The campfire skewer as defined in claim 4, the offset of the second portion forms an acute angle with the first axis.

* * * * *